(12) United States Patent
Nishida et al.

(10) Patent No.: US 8,045,541 B2
(45) Date of Patent: Oct. 25, 2011

(54) IP TELEPHONE SYSTEM, IP TELEPHONE APPARATUS AND METHOD FOR IDENTIFYING DESTINATION USER

(75) Inventors: Toshiko Nishida, Kanagawa (JP); Kiyoshi Toyoda, Tokyo (JP)

(73) Assignee: Panasonic Corporation, Osaka (JP)

( * ) Notice: Subject to any disclaimer, the term of this patent is extended or adjusted under 35 U.S.C. 154(b) by 1513 days.

(21) Appl. No.: 11/183,977

(22) Filed: Jul. 19, 2005

(65) Prior Publication Data

US 2006/0029043 A1 Feb. 9, 2006

(30) Foreign Application Priority Data

Aug. 4, 2004 (JP) ................ P2004-228584

(51) Int. Cl.
*H04M 7/00* (2006.01)
*H04L 12/66* (2006.01)

(52) U.S. Cl. .................. 370/352; 379/201.01

(58) Field of Classification Search .......... 370/352, 370/353, 354, 389, 390; 379/201.01, 220.01, 379/221.13
See application file for complete search history.

(56) References Cited

U.S. PATENT DOCUMENTS

| | | | |
|---|---|---|---|
| 6,618,587 B1 * | 9/2003 | Ghafoor | 455/419 |
| 7,027,582 B2 * | 4/2006 | Khello et al. | 379/220.01 |
| 7,072,459 B2 | 7/2006 | Murai | |
| 7,161,933 B2 * | 1/2007 | Stanford | 370/352 |
| 7,336,772 B1 * | 2/2008 | Velusamy | 379/88.17 |
| 2002/0181694 A1 | 12/2002 | Mani | |
| 2003/0048892 A1 | 3/2003 | Murai | |
| 2003/0074461 A1 * | 4/2003 | Kang et al. | 709/230 |
| 2004/0047341 A1 | 3/2004 | Staack et al. | |

FOREIGN PATENT DOCUMENTS

| | | |
|---|---|---|
| EP | 0869688 | 10/1998 |
| EP | 1263204 | 12/2002 |
| JP | 6-21882 | 1/1994 |
| JP | 10-171733 | 6/1998 |
| JP | 2002-101207 | 4/2002 |
| JP | 2003-87835 | 3/2003 |
| JP | 2003-125099 | 4/2003 |

(Continued)

OTHER PUBLICATIONS

English Language Abstract of KR 2004-0028333.

(Continued)

*Primary Examiner* — Ahmad Matar
*Assistant Examiner* — Nafiz E Hoque
(74) *Attorney, Agent, or Firm* — Greenblum & Bernstein, P.L.C.

(57) ABSTRACT

An IP telephone system includes a source IP telephone apparatus, a destination telephone apparatus, a Web server and an ENUM server. The IP telephone apparatuses are connected to an IP network. The Web server stores call reception screen information corresponding to a telephone number assigned to the source or destination IP telephone apparatus. The ENUM server stores a NAPTR resource record in which a URI specifies link information related to the call reception screen information stored on the Web server. In the IP telephone system, the IP telephone apparatus that has received a call transmits, to the ENUM server, a query for a NAPTR record corresponding to an intended recipient's telephone number. The IP telephone apparatus then transmits, to the Web server, a request for the call reception screen information corresponding to the intended recipient's telephone number according to the obtained NAPTR resource record, and displays a call reception screen according to the obtained call reception screen information.

9 Claims, 17 Drawing Sheets

| Telephone number | URI | User name | Call reception screen |
|---|---|---|---|
| 05012341111 | taro@tokyo.sip.jp | taro | taro(^0^)/ |
| 05012342222 | hanako@tokyo.sip.jp | hanako | hanako(0^0^0) |

FOREIGN PATENT DOCUMENTS

| | | |
|---|---|---|
| JP | 2003-188992 | 7/2003 |
| JP | 2004-147195 | 5/2004 |
| KR | 1999-0086215 | 12/1999 |
| KR | 2004-0028333 | 4/2004 |
| WO | 01/41416 | 6/2001 |

OTHER PUBLICATIONS

English Language Abstract of KR 1999-0086215.
Enum Trial Japan, "ENUM Trial Japan First Report," May 2004, together with a partial English translation of the same.
U.S. Appl. No. 11/183,966 to Toshiko Nishida et al., filed Jul. 19, 2005.
U.S. Appl. No. 11/183,982 to Toshiko Nishida et al., filed Jul. 19, 2005.
U.S. Appl. No. 11/183,962 to Toshiko Nishida et al., filed Jul. 19, 2005.
U.S. Appl. No. 11/188,868 to Toshiko Nishida, filed Jul. 26, 2005.
English Language Abstract of JP 2003-188992.
P. Faltstrom, CISCO Systems INC.: "E.164 number and DNS"; rfc2916.txt IETF Standard, Internet Engineering Task Force, IETF, CH, Sep. 2000, XP015008699.
P. Faltstorm et al, CISCO Systems: "The E. 164 to Uniform Resource Identifiers (URI) Dynamic delegation Discovery System (DDDS) Application (ENUM); rfc3761. txt; "IETF Standard, Internet Engineering Task Force, IETF, CH, Apr. 2004, XP015009541.
Yoneya, No. 12 Advanced club, Nikkei Network No. 47, Japan, Nikkei Business Publications, Inc., Feb. 22, 2004, pp. 116-120.
Chimura, "Saishin Network Gjyutsu Taikei No. 8 IP Telephone (Kouhen)", Nikkei Byte No. 231, Japan, Nikkei Business Publications, Inc., Jul. 22, 2002, pp. 104-109.
English language Abstract of JP 2002-101207, Apr. 5, 2002.
English language Abstract of JP 6-21882, Jan. 28, 1994.
English language Abstract of JP 2004-147195, May 20, 2004.
English language Abstract of JP 2003-87835, Mar. 20, 2003.
English language Abstract of JP 2003-125099, Apr. 25, 2003.
English language Abstract of JP 10-171733, Jun. 26, 1998.

* cited by examiner

Fig.3

| Telephone number | URI |
|---|---|
| 05012341111 | taro@tokyo.sip.jp |
| 05012342222 | hanako@tokyo.sip.jp |

Fig.6

| Enum domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | taro@tokyo.sip.jp | |
| | IN NAPTR | 100 | 10 | "u" | "E2U+http" | "!^.*$!http:" | //www.tokyo.sip.com/user taro.html | |
| 2.2.2.2.4.3.2.1.0.5.1.8.e164.arpa | IN NAPTR | 100 | 10 | "u" | "E2U+sip" | "!^.*$!sip:" | hanako@tokyo.sip.jp | |
| | IN NAPTR | 100 | 10 | "u" | "E2U+http" | "!^.*$!http:" | //www.tokyo.sip.com/user hanako.html | |

NAPTR resource record

Fig.7

| URI | IP address |
|---|---|
| taro@tokyo.sip.jp | 192.168.1.1 |
| hanako@tokyo.sip.jp | 192.168.1.2 |
| jiro@tokyo.sip.jp | 192.168.1.3 |
| yoshiko@tokyo.sip.jp | 192.168.1.4 |

Fig.8

| URL(URI) | Telephone number | User name | Call reception screen |
|---|---|---|---|
| http://www.tokyo.sip.com/user taro.html | 05012341111 | taro | taro(^0^)/ |
| http://www.tokyo.sip.com/user hanako.html | 05012342222 | hanako | hanako(0^0^0) |

Fig.10

INVITE sip:taro@tokyo.sip.jp SIP/2.0
Via:SIP/2.0/UDP Tokyo.sip.jp:5060;branch=z9hG4bk776as3
From:jiro@tokyo.sip.jp;tag=r18f061962
To:taro@tokyo.sip.jp

Fig.14

| Telephone number | URI | User name | Call reception screen |
|---|---|---|---|
| 05012341111 | taro@tokyo.sip.jp | taro | taro(^0^)/ |
| 05012342222 | hanako@tokyo.sip.jp | hanako | hanako(0^0^0) |

Fig.15

| Enum domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | | taro@tokyo.sip.jp |
| 2.2.2.2.4.3.2.1.0.5.1.8.e164.arpa | IN NAPTR | 100 | 10 | "u" | "E2U+sip" | "!^.*$!sip:" | | hanako@tokyo.sip.jp |

NAPTR resource record

IP TELEPHONE SYSTEM, IP TELEPHONE APPARATUS AND METHOD FOR IDENTIFYING DESTINATION USER

BACKGROUND OF THE INVENTION

1. Field of the Invention

This invention relates to an IP telephone system, an IP telephone apparatus, and a method for identifying a destination user.

2. Description of Related Art

Recently, in addition to the rapid growth of the internet, attention has been directed towards both calling a phone apparatus located at a remote location at a low cost and an IP telephone system in which free calls can be made between registered users who have IP telephone apparatuses. In this kind of IP telephone system, an IP telephone system in which the user's convenience is increased via implementation of a screen display when a call is received or by specifying a ring tone from the calling side is being proposed (for example, see Related Art 1).

Meanwhile, currently, attention is being directed to ENUM as a technology that efficiently manages the information that is used by various communication methods such as telephones, faxes, cell phones or e-mails and enables communications according to the usage environment. ENUM identifies the service over the internet with a unique global identification number that is represented by the E.164 number by using the DNS (Domain Name System). Currently, standardization activity is being carried out by the IETF (Internet Engineering Task force), and thus the protocols to be used are currently being discussed (for example, see Publication 1).

| [Related Art 1] | Japanese Laid Open Publication 2003—188992 |
|---|---|
| [Publication 1] | Issued by ENUM Trial Japan "ENUM Trial Japan First Report" May, 2004 |

However, in the above-noted conventional IP telephone system, the display of a screen display corresponding to the caller upon receiving a call or the specifying of a ring tone can only be done from the caller side, and so responses to the usage environment of the receiving side cannot be specified.

Traditionally, in an IP telephone apparatus that is set up within a household or within a company, a plurality of users share the apparatus. In the commonly used IP telephone apparatus, when a user answers an incoming phone call for a different user, it is necessary for the other user to be contacted and the phone call must also be forwarded. In this kind of a usage environment, since it is possible to determine the intended user before the phone call is taken, the process of forwarding the incoming phone call can be omitted, and the user's convenience increases.

SUMMARY OF THE INVENTION

In response to the present situation, the present invention provides an IP telephone system, an IP telephone apparatus and a destination user identification method that can identify the intended user before an incoming phone call is answered.

In the present invention, an IP telephone system includes an IP telephone apparatus connected to an IP network, a Web server that stores the call reception screen information that corresponds to a telephone number of an IP telephone apparatus, an ENUM server that stores the NAPTR resource record wherein link information for the call reception screen information that is stored by the Web server is specified by the URI, and when receiving a call, the IP telephone apparatus transmits to the ENUM server a query for the NAPTR recourse record based on the telephone number of the call recipient, transmits to the Web server a request for the call reception screen information that corresponds to the telephone number of the call recipient according to the NAPTR resource record that is returned from the ENUM server, and displays the call reception screen that corresponds to the call reception screen information.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 is a diagram that shows one example of the table that is stored in the FROM of the IP telephone of the first embodiment of the present invention;

FIG. 6 is a diagram that shows one example of the NAPTR record that is stored in the DB of the ENUM server of the first embodiment of the present invention;

FIG. 7 is a diagram that shows one example of the data that is stored in the DB of a DNS server of the first embodiment of the present invention;

FIG. 8 is a diagram that shows one example of the data that is stored in the DB of a Web server of the first embodiment of the present invention;

FIG. 10 is a diagram that shows one example of the contents of the "INVITE" message that is sent from the source IP telephone to the destination IP telephone in the IP telephone system of the first embodiment of the present invention;

FIG. 14 is a diagram that shows one example of the data that is stored in the call reception screen information table of the IP telephone of the second embodiment of the present invention;

FIG. 15 is a diagram that shows one example of the NAPTR record that is stored in the DB of an ENUM server of the second embodiment of the present invention;

DETAILED DESCRIPTION OF PREFERRED EMBODIMENTS

The embodiments of the present invention are explained in the following, in reference to the above-described drawings.

First Embodiment

Figure 1:
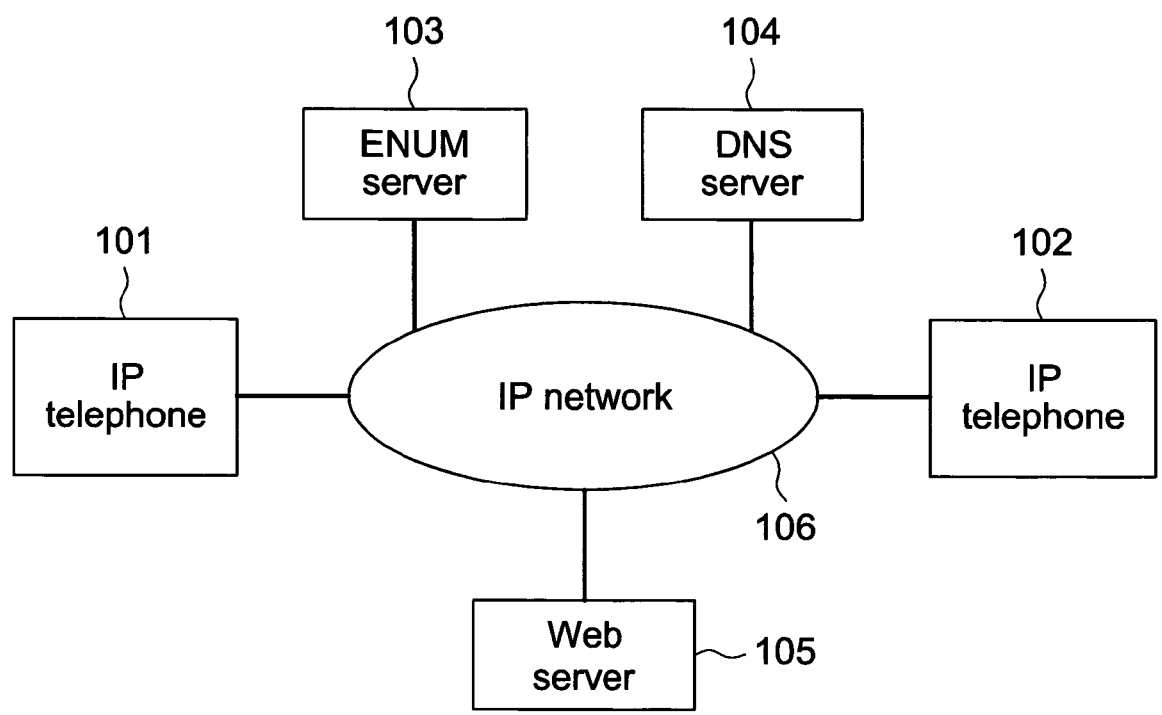
FIG. 1 is a network configuration to which an IP telephone system of the first embodiment of the present invention applies.

FIG. 1 is a network configuration to which an IP telephone system of the first embodiment of the present invention applies.

As shown in FIG. 1, in the IP telephone system of the first embodiment, a plurality of IP telephone apparatuses (hereinafter referred to as "IP telephone") 101 and 102, ENUM server 103, DNS server 104 and Web server 105 are connected via IP network 106. In addition, the configuration is not limited by FIG. 1, as the IP telephone system can connect three or more IP telephones on IP network 106.

IP telephone 101 (102) has a feature which allows it to conduct voice communications with other IP telephones through IP network 106. In addition, it also has a browser feature that allows it to access Web server 105 according to the http protocol, and it can also read the HTML document that is provided by Web server 105.

In particular, IP telephone 102 is commonly used by a plurality of users. In addition, a telephone number is assigned to each of the plurality of users of IP telephone 102. In the following explanation, IP telephone 102 will be shared by two users.

ENUM server 103 is equipped with a database (DB) that can store a NAPTR resource record which is explained later (hereinafter referred to as "NAPTR record"). In response to a query from IP telephone 101 (102), ENUM server 103 sends the NAPTR record that is stored in the DB to IP telephone 101 (102).

DNS server 104 is equipped with a DB that stores a URI specified by the NAPTR resource record and a corresponding IP address. In response to a query from IP telephone 101 (102), the IP address that is stored in the DB is sent to IP telephone 101 (102).

Web server 105 is equipped with a DB that can store the information that is needed to specify the call reception screen that corresponds to the telephone number of IP telephone 101 (102) that is connected to IP network 106 (hereinafter referred to as "call reception screen information"). The call reception screen information that is stored in the DB can, for example, be stored by a user of IP telephone 101 (102) through IP network 106. In addition, it can be configured so that an administrator of an IP telephone service can store the call reception screen information in response to a request from a user. In response to a request from IP telephone 101 (102), Web server 105 sends the call reception screen information that is stored in its DB to IP telephone 101 (102). A detailed explanation of the call reception screen information will be provided later.

Figure 2:
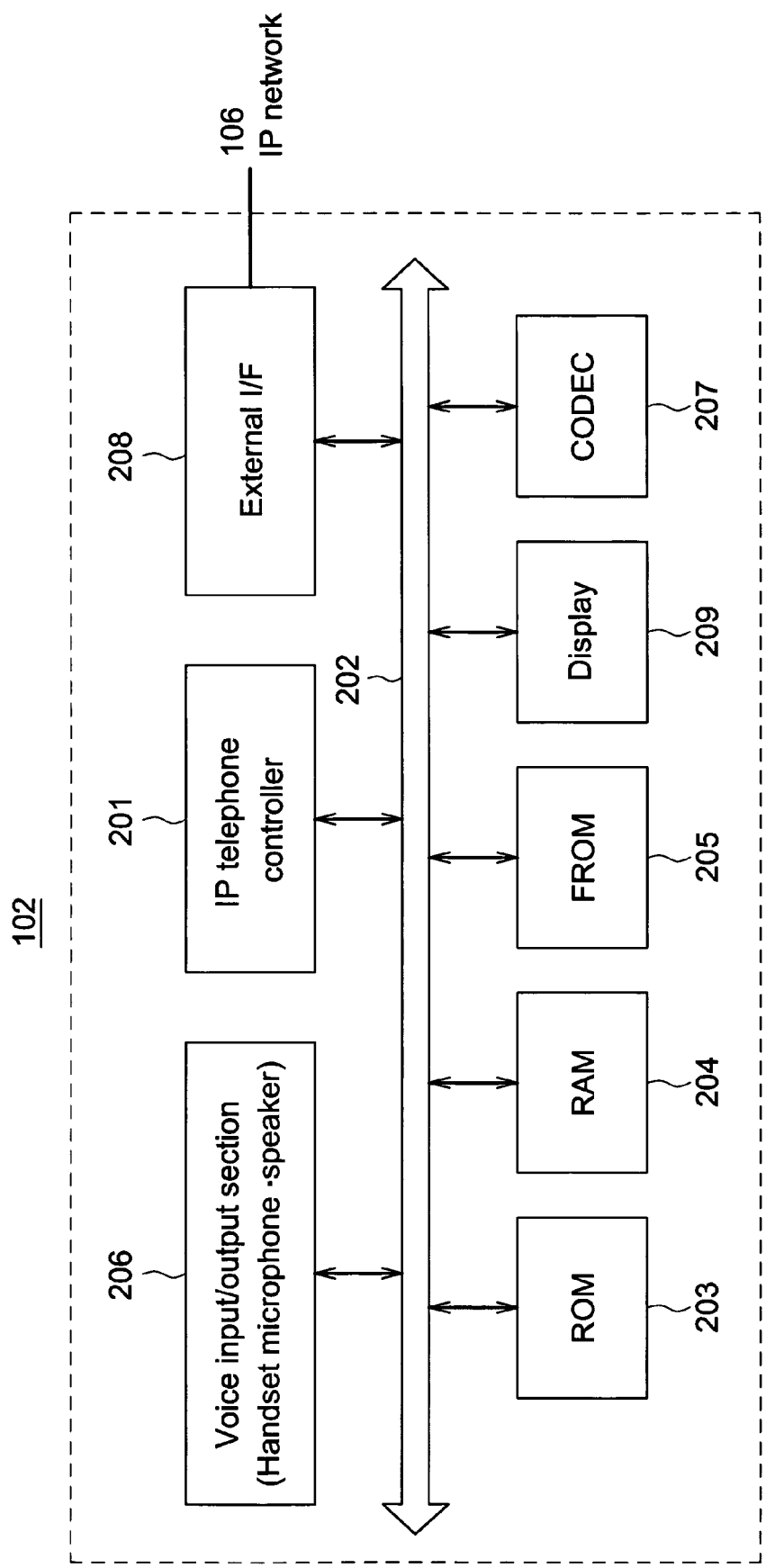
FIG. 2 is a block diagram that shows the configuration of an IP telephone that makes up the IP telephone system of the first embodiment of the present invention.

FIG. 2 is a block diagram that shows the configuration of IP telephone 102 of the first embodiment of the present invention. In addition, the configuration of IP telephone 101 is identical to that of IP telephone 102.

IP telephone 102 of FIG. 2 is equipped with IP telephone controller 201 that controls the entire apparatus. ROM 203, RAM 204, and FROM 205 are connected to IP telephone controller 201 through bus 202. In addition, voice input/output section 206, CODEC 207, external interface (I/F) 208, and display 209 are connected to IP telephone controller 201 through bus 202.

IP telephone controller 201 performs the controlling process discussed below by executing the control program that is stored in ROM 203. In this case, IP telephone controller 201 uses RAM 204 as a work area.

IP telephone controller 201 controls all of the actions necessary to conduct a voice communication through IP network 106. For example, IP telephone controller 201 controls the call control procedure between the recipient and originating ends by following a call control protocol, such as SIP or H.323.

In addition, IP telephone controller 201 controls a query to ENUM server 103 for the NAPTR record that corresponds to the recipient end and the processing of the response to this query, in addition to a query to DNS server 104 for an IP address and the processing of the response to this query.

In addition, IP telephone controller 201 controls the access to Web server 105 in addition to the reading of the HTML document that is provided by Web server 105.

FROM 205 stores the address book data that is utilized to specify a recipient when a call is originating from the present apparatus. In addition, when a plurality of telephone numbers are assigned to the present apparatus, the URI data that corresponds to each telephone number is stored in a table that is stored in FROM 205.

FIG. 3 shows one example of a table that is stored in FROM 205. FIG. 3 is an example of a situation in which two telephone numbers are assigned to IP telephone 102. In the table of FIG. 3, URI "taro@tokyo.sip.jp" that corresponds to telephone number "05012341111" is stored. Similarly, URI "hanako@tokyo.sip.jp" that corresponds to telephone number "05012342222" is also stored.

Voice input/output section 206 receives a voice from the user of IP telephone 102 and also outputs this voice to the user. The voice input section of voice input/output section 206 includes a handset microphone, and the voice output section includes a speaker.

CODEC 207 converts the analog data that is inputted by voice input/output section 206 into digital data, and it also converts the digital data that is inputted from IP network 106 into analog data. In addition, CODEC 207 can encode voice data and compress or decompress voice data.

External I/F 208 functions as the interface between IP telephone 102 and IP network 106 that is connected to the IP telephone.

Display 209 includes, for example, a liquid crystal display or the such, and it displays the present status of the present apparatus or the call reception screen information.

Figure 4:
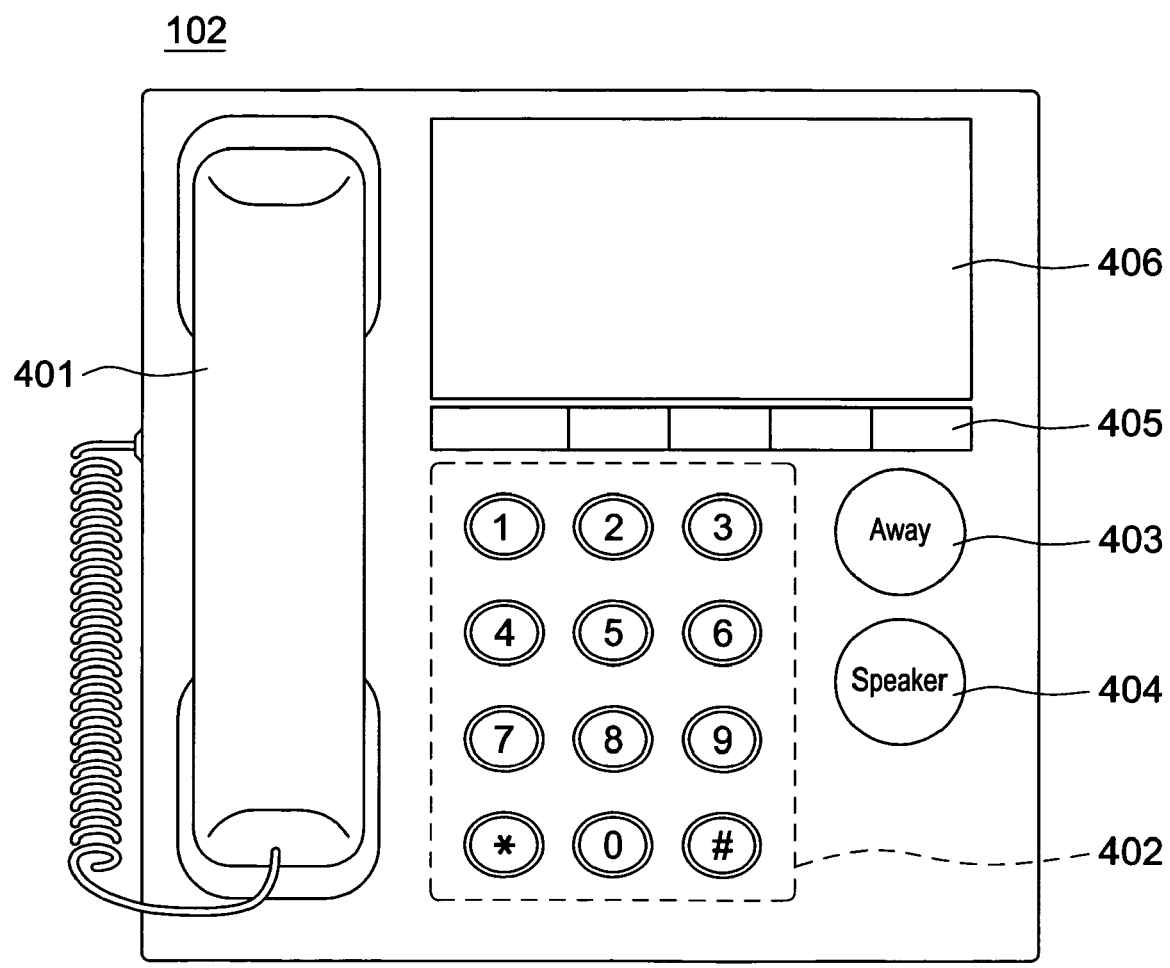
FIG. 4 is a frontal diagram of an external view of the IP telephone of the first embodiment of the present invention.

FIG. 4 is a frontal diagram of the exterior of IP telephone 102 of the first embodiment of the present invention. In addition, IP telephone 101 is configured identically to IP telephone 102.

As shown in FIG. 4, IP telephone 102 includes handset 401 that receives voices from the user. The telephone also includes dial pad 402 for inputting a telephone number or the like. Furthermore, away key 403 for switching the telephone to an answering mode and speaker key 404 for switching to a speaker phone mode are located on the right side of dial pad 402.

Above dial pad 402 is function key 405 that can be configured with various functions such as a one touch call function. Above function key 405 is display 209 that includes liquid crystal display 406.

Figure 5:
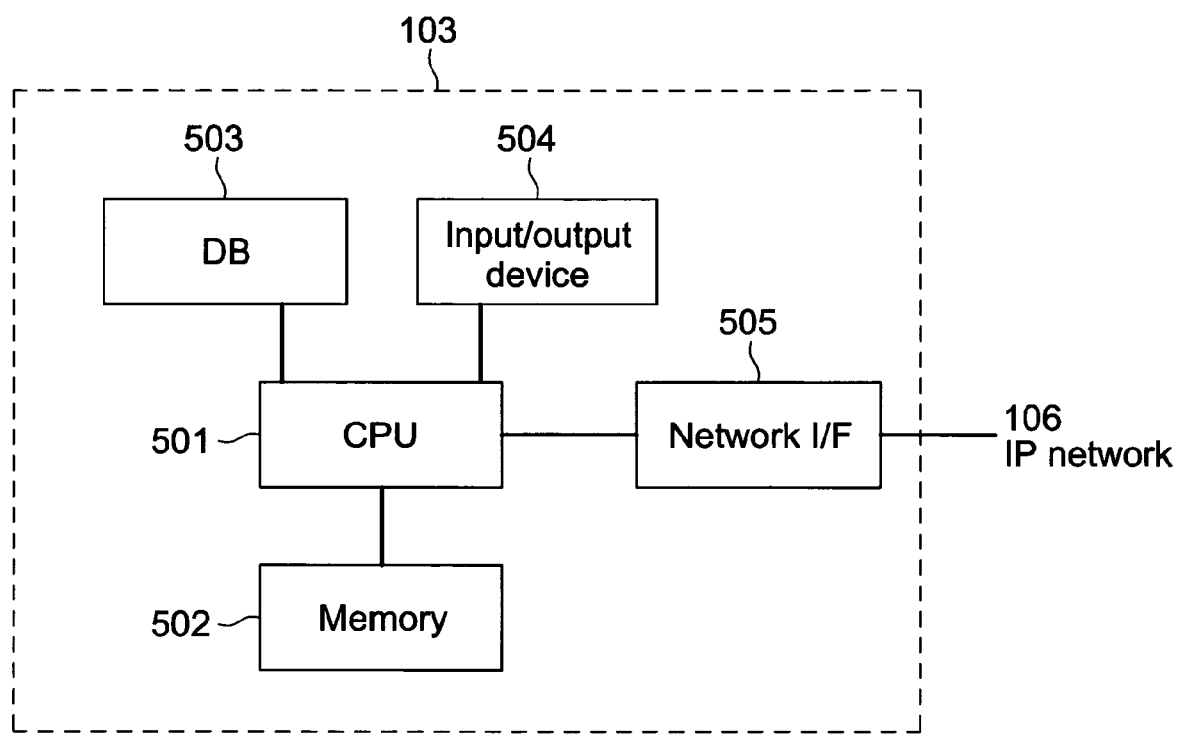
FIG. 5 is a block diagram that shows the representative configuration of an ENUM server of the first embodiment of the present invention.

FIG. 5 is a block diagram of a representative configuration of ENUM server 103 for the IP telephone system of the first embodiment of the present invention. In addition, DNS server 104 and Web server 105 of the IP telephone system of this embodiment are configured identically except for the contents of the data that is stored in the DB.

As shown in FIG. 5, ENUM server 103 is equipped with CPU 501 that controls the entire server. Memory 502 is connected to CPU 501. Memory 502 can function as a ROM that stores the control program for ENUM server 103 that is read-in and executed by CPU 501, in addition to functioning as a RAM that functions as a work memory for CPU 501 when it is executing the control program.

In addition, database (DB) 503 is connected to CPU 501. DB 503 stores the NAPTR record that is explained later. When CPU 501, for example, receives a query for an NAPTR record from IP telephone 101, it searches through the data that is stored in DB 503 for the appropriate NAPTR record and sends this to IP telephone 101.

Furthermore, input/output device 504 is connected to CPU 501. Input/output device 504 can include, for example, a keyboard and the like for an input device and a display and the like for an output device. The input device is used, for example, to add and edit data that is stored in DB 503. The output device is used, for example, when an administrator of ENUM server 103 wants to verify the contents of the data that is stored in DB 503.

Furthermore, network interface (I/F) 505 is connected to CPU 501. Network I/F 505 is the interface for IP network 106 that is connected to ENUM server 103.

FIG. 6 shows one example of the NAPTR record that is stored in DB 503 of ENUM server 103 of the first embodiment of the present invention. In FIG. 6, the NAPTR record that corresponds to the domain name that can be obtained from telephone numbers "05012341111" and "05012342222" is shown.

In FIG. 6, URI "taro@tokyo.sip.jp" and "//www.tokyo.sip.com/usertaro.html" correspond to domain name "1.1.1.1.4.3.2.1.0.5.1.8.e164.arpa" that can be obtained from telephone number "05012341111". The notation "E2U+sip" in the first service field indicates that a SIP protocol can be used, and the notation "E2U+http" in the second service field indicates that an http protocol can be used.

In addition, URI "hanako@tokyo.sip.jp" and "//www.tokyo.sip.com/userhanako.html" correspond to domain name "2.2.2.2.4.3.2.1.0.5.1.8.e164.arpa" that can be obtained from telephone number "05012342222". The notation "E2U+sip" in the first service field indicates that the SIP protocol can be used, and the notation "E2U+http" in the second service field indicates that the http protocol can be used.

FIG. 7 shows one example of the data that is stored in the DB of DNS server 104 of the first embodiment of the present invention.

In FIG. 7, a case is explained in which the IP addresses corresponding to URI "taro@tokyo.sip.jp", "hanako@tokyo.sip.jp", "jiro@tokyo.sip.jp", and "yoshiko@tokyo.sip.jp" are stored. Specifically, IP addresses "192.168.1.1", "192.168.1.2", "192.168.1.3", and "192.168.1.4" correspond to URIs "taro@tokyo.sip.jp", "hanako@tokyo.sip.jp", "jiro@tokyo.sip.jp", and "yoshiko@tokyo.sip.jp" respectively.

FIG. 8 shows one example of the data that is stored in the DB of Web server 105 of the first embodiment of the present invention. The contents of FIG. 8 are expressed in HTML (Hypertext Markup Language) as an example.

In FIG. 8, a case is explained in which the telephone number, the user name, and the call reception screen that correspond to URL(URI) "//www.tokyo.sip.com/usertaro.html" and "//www.tokyo.sip.com/userhanako.html" are stored. Specifically, telephone number "05012341111", user name "taro" and call reception screen "taro (ˆoˆ)/" which correspond to URL(URI) "//www.tokyo.sip.com/usertaro.html" are stored. In a similar fashion, telephone number "05012342222", username "hanako" and call reception screen "hanako(oˆoˆo)" which correspond to URL(URI) "//www.tokyo.sip.com/userhanako.html" are stored.

The following describes the operations until IP telephone 101 communicates with IP telephone 102 in the IP telephone system of the first embodiment of the present invention.

In this illustration, it will be assumed that the NAPTR record of FIG. 6 is stored in DB 303 of ENUM server 103, the data of FIG. 7 is stored in the DB of DNS server 104, and the data of FIG. 8 is stored in the DB of Web server 105. In addition, it will also be assumed that telephone numbers "05012341111" and "05012342222" are assigned to IP telephone 102.

When a conversation is being carried out with IP telephone 102, first, IP telephone 101 receives from the user one of the telephone numbers that are assigned to IP telephone 102, and receives as an input telephone number. For the purposes of this example, it will be assumed that of the telephone numbers for IP telephone 102, "05012341111" was received as an input. When the telephone number is input, IP telephone 101 transmits, to ENUM server 103, a query for the NAPTR record that corresponds to the telephone number (ST901). From hereon after, the query for the NAPTR record will be referred to as "NAPTR query".

In the present situation, IP telephone 101 converts "05012341111", which was inputted by the operator, into the E.164 number "+81-5-012341111" which includes the country code, and then changes this into "+815012341111" by only leaving the leading+sign and the numbers. Then, the characters excluding the numbers are removed and dots are placed between each number to get "8.1.5.0.1.2.3.4.1.1.1.1". Then, the numbers are reversed in order and e164.arpa is added into the end of the character sequence. By doing this, domain name "1.1.1.1.4.3.2.1.0.5.1.8.e164.arpa" is obtained, and the NAPTR record that corresponds to this character sequence is queried.

When the NAPTR query is received, ENUM server 103 searches for the NAPTR record that corresponds to domain name "1.1.1.1.4.3.2.1.0.5.1.8.e164.arpa", and sends a response including the appropriate NAPTR record to IP telephone 101 (ST902). From hereon after, the response that includes the NAPTR record will be referred to as "NAPTR response". In this case, of the NAPTR records that are shown in FIG. 6, ENUM server 103 searches for the NAPTR records belonging to the upper portion of the ENUM domain name of the table, and the response including the appropriate NAPTR record is sent to IP telephone 101.

When the NAPTR response is received, IP telephone 101 transmits to DNS server 104 a query for the IP address that corresponds to URI "taro@tokyo.sip.jp" whose SIP compatibility is.specified by the NAPTR record (ST903). From hereon after, this query for an IP address will be referred to as "IP address query".

When the IP address query is received, DNS server 104 searches for the IP address that corresponds to the URI, and sends the IP address response that includes the IP address to IP telephone 101 (ST904). In this situation, DNS server 104 searches for IP address "192.168.1.1" which is listed first in FIG. 7, and a response that includes the IP address is sent to IP telephone 101. From hereon after, this response that includes an IP address will be referred to as "IP address response".

When the IP address response is received, IP telephone 101 confirms the IP address that is assigned to the telephone number that was specified by the user from amongst the telephone numbers of IP telephone 102. Then, IP telephone 101 sends an "INVITE" message to that IP address (ST905).

At this point, one example of the contents of the "INVITE" message that is sent from IP telephone 101 to IP telephone 102 will be explained.

FIG. 10 shows one example of the contents of the "INVITE" message that is sent from IP telephone 101 to IP telephone 102.

As shown in FIG. 10, the "INVITE" message includes a From header as shown in row 3, and also a To header as shown in row 4. In the From header, URI "jiro@tokyo.sip.jp" that corresponds to the telephone number of the source IP telephone 101 is stored. In addition, U RI "taro@tokyo.sip.jp" that corresponds to the telephone number of the destination IP telephone 102 is stored in the To header. In addition, the contents of the From header and the To header are not limited to the contents that are shown in FIG. 10.

When IP telephone 101 receives the "INVITE" message from IP telephone 101, IP telephone 102 obtains the telephone number (from hereon after this will be referred to as the "call recipient number") that is specified as the call destination telephone number by the URI that is specified by the To header. Specifically, by searching the table stored in FROM 205 for the telephone number in accordance with the URI that is specified by the To header, the call recipient number is obtained. At this point, based upon URI "taro@tokyo.sip.jp" that is specified by the To header, telephone number "05012341111" is obtained as a call recipient number.

Then, using the same process as when IP telephone 101 receives a telephone number as an input, IP telephone 102 transmits to ENUM server 103 a query for the NAPTR record that corresponds to the call recipient number (ST906). In other words, IP telephone 102 converts "05012341111", which was obtained based upon the "INVITE" message, into the E.164 number "+81-5-012341111" which includes the country code, and then changes this into "+815012341111" by only leaving the leading+sign and the numbers. Then, the characters excluding the numbers are removed and dots are placed between each number to get "8.1.5.0.1.2.3.4.1.1.1.1". Then, the numbers are reversed in order and e164.arpa is added into the end of the character sequence. By doing this, the domain name "1.1.1.1.4.3.2.1.0.5.1.8.e164.arpa" is obtained, and the NAPTR record that corresponds to this character sequence is queried.

When the NAPTR query is received, ENUM server 103 searches for the NAPTR record that corresponds to domain name "1.1.1.1.4.3.2.1.0.5.1.8.e164.arpa", and a response that includes the NAPTR record is sent back to IP telephone 102 (ST907). In this case, similar to the handling of ST902, ENUM server 103 searches for the NAPTR records belonging to the upper ENUM domain name shown in FIG. 6, and the NAPTR response that includes the NAPTR record is sent back to IP telephone 102.

When the NAPTR response is received, IP telephone 102 access Web server 105 based upon URI "//www.tokyo.sip-.com/usertaro.html" which is specified by the NAPTR record which indicates that it is http protocol compatible, and requests the call reception screen information (ST908).

When this call reception screen information request is received, Web server 105 searches for the corresponding call reception screen information, and this call reception screen information is sent back to IP telephone 102 (ST 909). In this case, of the data shown in FIG. 8, Web server 105 sends back "taro(^o^)/" as the call reception screen information.

Once the call reception screen information is obtained, IP telephone 102 performs the steps necessary to display the call reception screen on display 209 (from hereon after, this will be referred to as "reception screen displaying process") (ST910). After the call reception screen displaying process is carried out, a calling sound is produced by IP telephone 102. At this point, the previously obtained call reception screen "taro(^o^)/" is displayed on display 209 of IP telephone 102. In addition to the calling sound being produced, a "180 RINGING" message is sent from IP telephone 102 to IP telephone 101 (ST911).

Then, once it is detected that IP telephone 102 is off hook, a "200 OK" message that indicates a permission to connect is sent from IP telephone 102 to IP telephone 101 (ST 912). When the "200 OK" message is received, an "ACK" message is sent from IP telephone 101 to IP telephone 102 (ST 913). When this "ACK" message is received by IP telephone 102, the connection between IP telephone 101 and IP telephone 102 is in a telephone call capable state. After that, voices are outputted by IP telephone 101 and a telephone call is carried out. The process leading up to the telephone call between IP telephone 101 and IP telephone 102 is carried out in this way.

Figure 9:
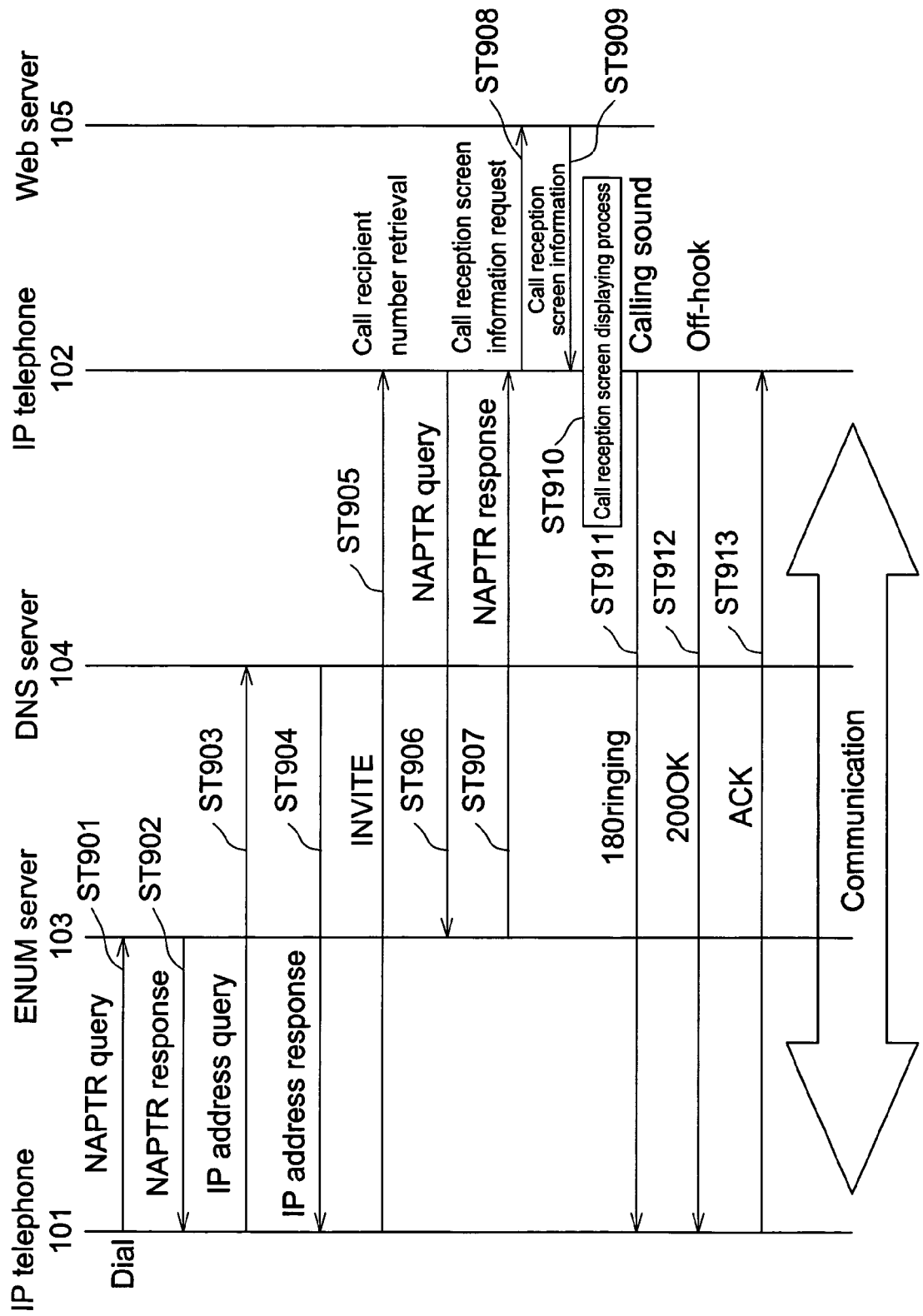
FIG. 9 is a sequence diagram that describes the operation until a source IP telephone communicates with a destination IP telephone in the IP telephone system of the first embodiment of the present invention.
Figure 11:
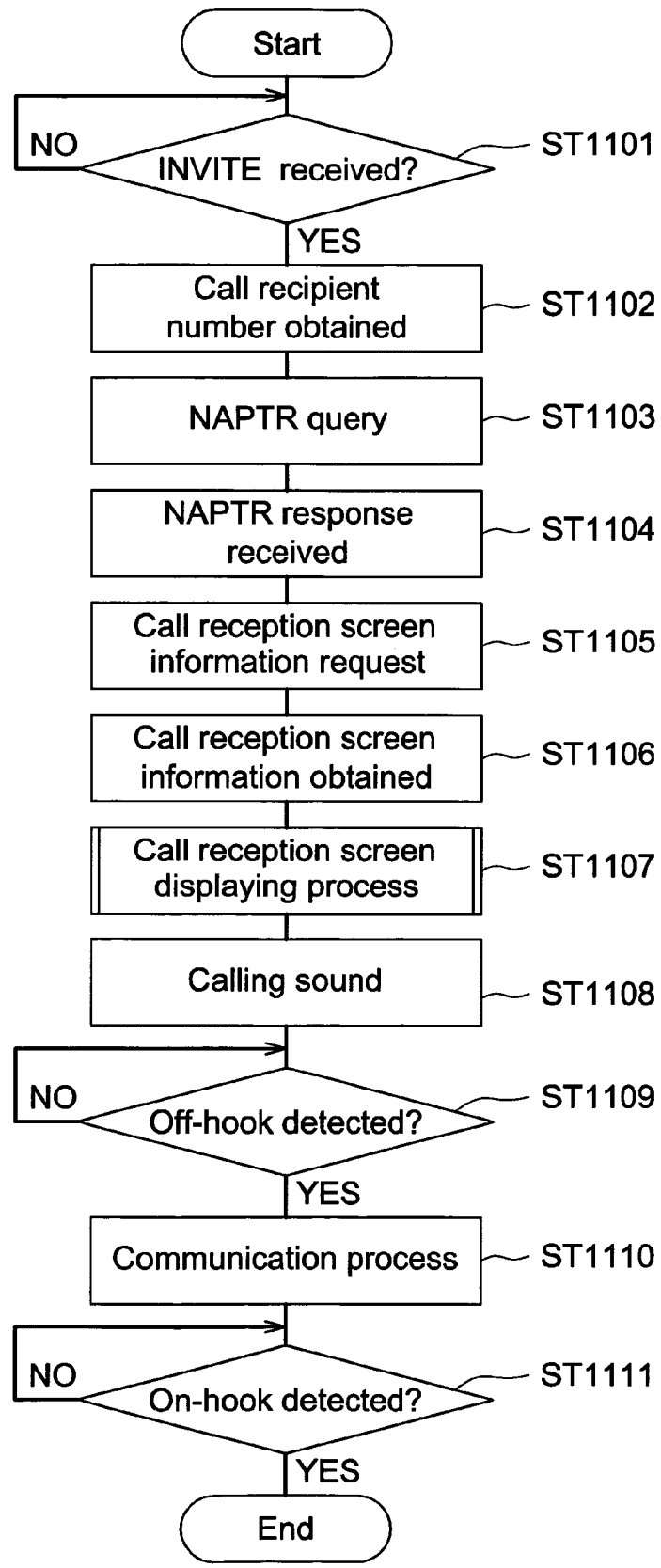
FIG. 11 is a sequence diagram that describes the operation of the destination IP telephone in the FIG. 9 sequence.

FIG. 11 is a flowchart that describes the operation of the destination IP telephone 102 in the FIG. 9 sequence.

IP telephone 102 monitors, in a waiting state, for an "INVITE" message to be received via IP network 106 (ST1101). When the "INVITE" message is received, the call recipient number is obtained from the To header of the "INVITE" message using the above-described process (ST1102).

Once the call recipient number is obtained, IP telephone 102 transmits to ENUM server 103 a query for the NAPTR record that corresponds to the call recipient number (ST1103). A NAPTR response is returned from ENUM server 103 in response to this query, and IP telephone 102 receives this NAPTR response (ST1104).

After the NAPTR response is received, IP telephone 102 accesses Web server 105 based upon the URI that is specified by the NAPTR record, from amongst the NAPTR records included in the NAPTR response, as being http protocol compatible, and the call reception screen information is requested (ST1105). In response to this request, the call reception screen information is sent from Web server 105, and IP telephone 102 receives the call reception screen information. Through this, IP telephone 102 obtains the call reception screen information (ST1106).

After the call reception screen information is obtained, IP telephone 102 performs the call reception screen displaying process (ST1107). After the call reception screen displaying process is completed, a calling sound is produced (ST1108). IP telephone 102 also sends a "180 RINGING" message in addition to the calling sound being produced. While this "180 RINGING" message is being sent, IP telephone 102 checks to see if an off hook has been received from the user (ST1109). Until the off hook is received, step ST1109 is continued.

Once the off hook is detected, IP telephone 102 sends a "200 OK" that indicates a permission to connect, to the source IP telephone 101. Then, once the "ACK" message that corresponds to this "200 OK" is received from IP telephone 101, IP telephone 102 performs a communication process (ST1110).

With regards to the communication process, in addition to outputting the voice data that is sent from IP telephone 101, IP telephone 102 checks to see if an on hook has been received from the user (ST1111). If an on hook has been detected, IP telephone 102 terminates the communication process. Until an on hook is detected, step ST1111 is continued.

According to the IP telephone system of the first embodiment of the present invention, a plurality of telephone numbers are assigned to the destination IP telephone 102, and the source IP telephone 101 places a call by specifying a telephone number. Then, after receiving a NAPTR response that corresponds to the telephone number, an "INVITE" message is sent to the destination IP telephone 102. The destination IP telephone 102 then obtains the call recipient number from this "INVITE" message. Then, after receiving the NAPTR response that corresponds to this call recipient number, the call reception screen information is requested from Web server 105. Once the call reception screen information is received, the call reception screen displaying process is carried out. As a result of this, the call reception screen that corresponds to the telephone number that was specified by the source IP telephone 101 is displayed on display 209 of the destination IP telephone 102. Consequently, the user of IP telephone 102 can look at the call reception screen to identify the user who is the recipient, and thus the intended user can be identified before the phone is picked up.

In particular, in the IP telephone system of the first embodiment of the present invention, in response to a request from the destination IP telephone 102, the call reception screen information is received from Web server 105 in accordance with the http protocol. Consequently, the call reception screen information can be obtained by performing the telephone call control process in accordance with the http protocol.

In addition, in the IP telephone system of the first embodiment of the present invention, the destination IP telephone 102 obtains the call recipient number based upon the received "INVITE" message. More specifically, it obtains the call recipient number that corresponds to the telephone number of the URI that is described in the "INVITE" message. Because of this, it is possible to obtain the call recipient number in the process of carrying out the call control process in accordance with the SIP protocol.

In addition, the first embodiment of the present invention relates to a situation in which the call reception screen includes a combination of at least one of character data or some other face character data. However, the call reception screen is not only limited to these, and it can also include the user's face picture data, the character image data that corresponds to the user, some combination of these types of data, or some other character data.

Figure 12A:
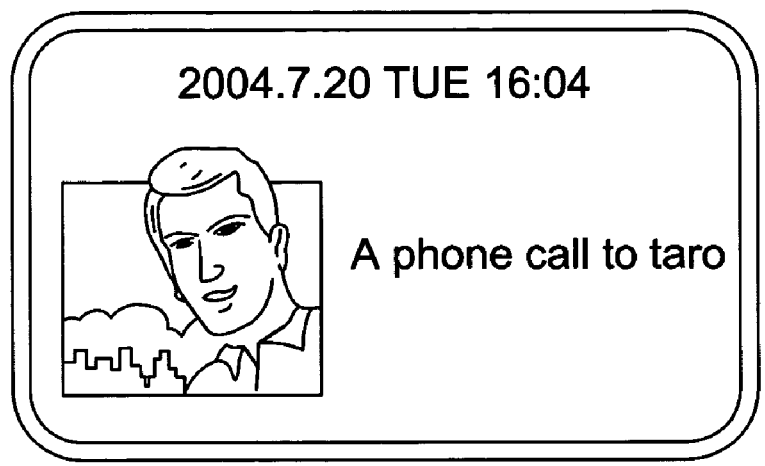
FIG. 12(a) and 12(b) are diagrams that show one example of the call reception screen that is displayed by the destination IP telephone in the IP telephone system of the first embodiment of the present invention.
Figure 12B:

FIG. 12 shows one example of the call reception screen that is displayed on display 209 of the destination IP telephone 102. This figure describes an example in which the call reception screen for the case when user name "taro" is specified. Regarding the call reception screen that is shown in FIG. 12(a), it shows the situation in which a male character image is combined with a message that indicates a call reception date and the user name of the recipient that is specified. In addition, regarding the call reception screen that is shown in FIG. 12(b), it shows the situation in which a heart mark image is combined with a message that indicates a call reception date and the user name of the recipient that is specified. By freely configuring the call reception screen in this manner, it is possible to provide an IP telephone system with improved convenience for the user.

In addition, in the first embodiment of the present invention, DNS server 104 is placed within IP network 106, the source IP telephone transmits to DNS server 104 a query for the IP address, and an "INVITE" message is sent to the received IP address. However, without being limited to this, it is possible to place a CA (Call Agent) that functions as a SIP server on IP network 106, and send the "INVITE" message by specifying the telephone number of the recipient end.

Furthermore, in the first embodiment of the present invention, an example in which the "INVITE" message includes the URI in the From header and the To header is explained. However, without being limited to this, it is also possible to list the telephone number in these fields instead. In this case, by extracting the telephone number as the call recipient number, it is possible to shorten the process through which the call recipient number is obtained from the table that is located within FROM 205.

Furthermore, in the first embodiment of the present invention, an example in which the destination IP telephone 102 obtains the call reception screen information from Web server 105 in accordance with the http protocol is explained. However, the method used to obtain the call reception screen information is not limited to obtaining the call reception screen information from Web server 105 in accordance with the http protocol. For example, LDAP (Lightweight Directory Access Protocol) protocol or FTP (File Transfer Protocol) protocol can be used to obtain the call reception screen information from a different database server. In these cases, it would still be possible to obtain the equivalent benefits of the first embodiment of the present invention.

It should be noted that the above explanation explains the situation in which the call reception screen information is obtained from Web server 105 by the destination IP telephone 102. However, it is also possible to obtain the equivalent benefits of the first embodiment of the present invention even when the call reception screen information that corresponds to each telephone number is previously stored in the destination IP telephone 102. Below, an embodiment of the present invention in which the call reception screen information is stored in the destination IP telephone 102 will be described.

Second Embodiment

Figure 13:
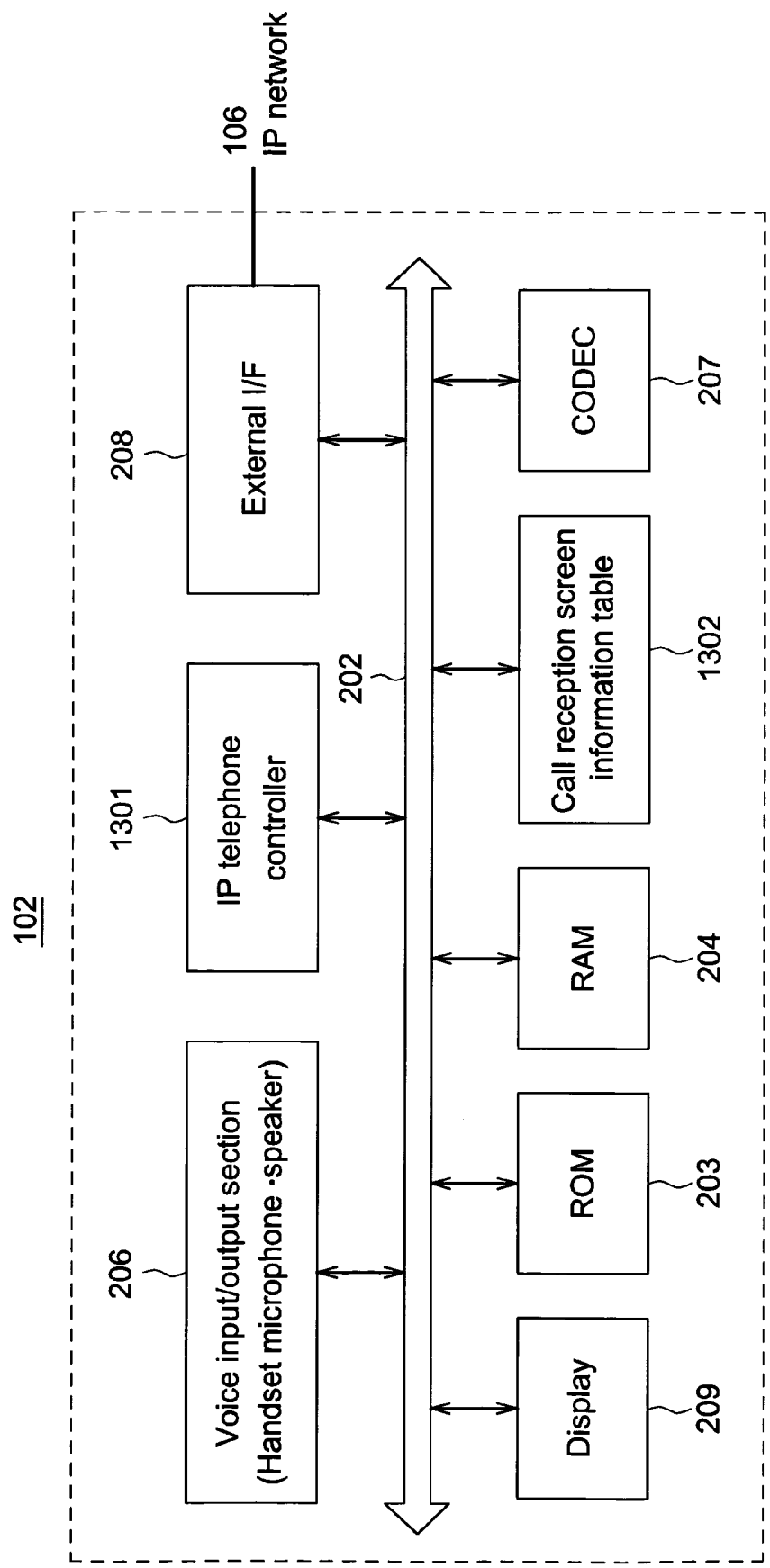
FIG. 13 is a block diagram that shows the configuration of an IP telephone of an IP telephone system of the second embodiment of the present invention.

FIG. 13 is a block diagram that describes the configuration of IP telephone 102 that relates to the second embodiment of the present invention.

IP telephone 102 of FIG. 13 is different from IP telephone 102 of FIG. 2 because IP telephone 102 of FIG. 13 has the table (hereinafter referred to as "call reception screen information table") in which all of the call reception screen information that correspond to the telephone numbers that are assigned to IP telephone 102 are stored, instead of in FROM 205. In addition, it will be assumed that the address book data that was stored in FROM 205 is stored in the call reception screen information table. In addition, IP telephone 102 of FIG. 13 is different from IP telephone 102 of FIG. 2 because the IP telephone controller of IP telephone 102 of FIG. 13 does not control Web server 105, but instead, controls the call reception screen by referring to the call reception screen information that is within the call reception screen information table. In addition, the elements of FIG. 13 that are labeled identically to those of FIG. 2 perform the same functions and thus their explanation will be omitted.

IP telephone controller 1301 is similar to IP telephone controller 201 of FIG. 2 except that it does not control access to Web server 105 and also does not control the reading of the HTML document that is provided by Web server 105.

In addition, IP telephone controller 1301 identifies the telephone number that corresponds to the URI that is specified by the source IP telephone 101 through IP network 106, and controls the call reception screen in accordance with the telephone number. More specifically, IP telephone controller 1301 searches for the telephone number that is stored in call reception screen information table 1302 in accordance with the URI that is specified by the source IP telephone 101, and controls the call reception screen by displaying the call reception screen that corresponds to the telephone number on display 209.

FIG. 14 shows one example of the data that is stored in call reception screen information table 1302. FIG. 14 is an example in which two telephone numbers are assigned to IP telephone 102.

In call reception screen information table 1302, a URI, a username, and a call reception screen that correspond to each telephone number that is assigned to IP telephone 102 are stored. In FIG. 14, URI "taro@tokyo.sip.jp", username "taro", and call reception screen "taro(ˆoˆ)/" which correspond to telephone number "05012348 111" are stored. In addition, URI "hanako@tokyo.sip.jp", username "hanako", and call reception screen "hanako(oˆoˆo)" which correspond to telephone number "05012342222" are also stored.

FIG. 15 shows one example of the NAPTR record that is stored in DB 503 of ENUM server 103 of the second embodiment of the present invention. FIG. 15 is an example in which the NAPTR record that corresponds to the domain name that can be obtained from telephone numbers "05012341111" and "05012342222" are stored.

In FIG. 15, URI "taro@tokyo.sip.jp" corresponds to domain name "1.1.1.1.4.3.2.1.0.5.1.8.e164.arpa" which can be obtained from telephone number "05012341111". In addition, URI "hanako@tokyo.sip.jp" corresponds to domain name "2.2.2.2.4.3.2.1.0.5.1.8.e164.arpa" which can be obtained from telephone number "05012342222".

Next, in the IP telephone system of the second embodiment of the present invention, the process up to the point at which IP telephone 101 and IP telephone 102 can engage in a phone conversation will be explained by using the sequence diagram of FIG. 16. The elements of FIG. 16 that are labeled identically to those of FIG. 9 perform the same function and thus an explanation of these will be omitted.

As a premise to explaining the calling procedure, it will be assumed that the NAPTR record of FIG. 15 is stored in DB 503 of ENUM server 103 and the data of FIG. 7 is stored in the DB of DNS server 104. In addition, it will be assumed that telephone numbers "05012341111" and "05012342222" are assigned to IP telephone 102.

The IP telephone system of the second embodiment of the present invention differs from the IP telephone system of the first embodiment of the present invention in that, after the destination IP telephone 102 receives the "INVITE" message that is indicated in FIG. 9, the call reception screen displaying process is carried out without obtaining the call reception screen information from Web server 105 (ST1601) and steps ST906-ST909 of FIG. 9 are not carried out.

Figure 16:
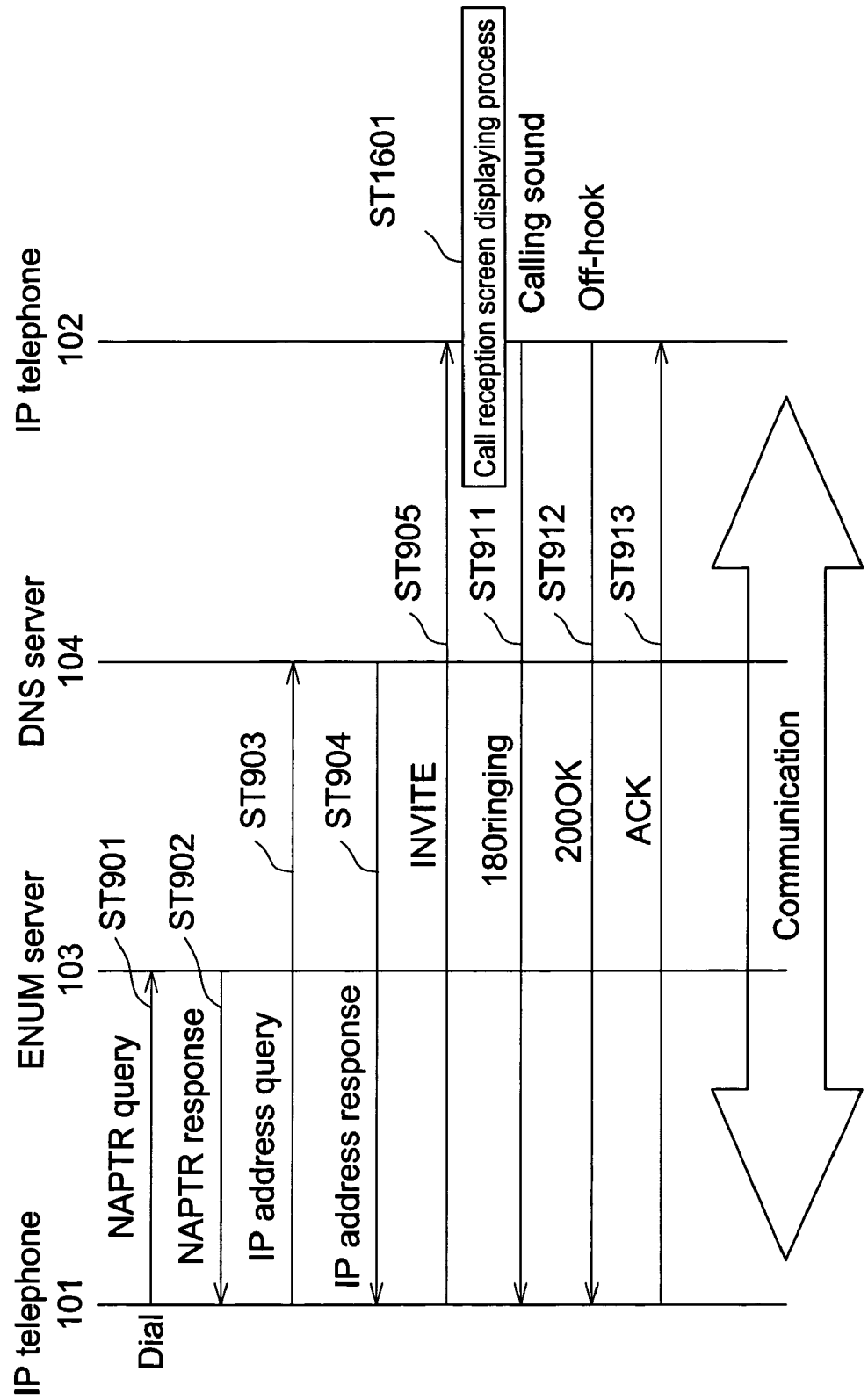
FIG. 16 is a sequence diagram that describes the operation until a source IP telephone communicates with a destination IP telephone in the IP telephone system of the second embodiment of the present invention.

More specifically, as shown in FIG. 16, after receiving an "INVITE" message from IP telephone 101 in step ST905, IP telephone 102 acknowledges the URI that is specified by the To header. It will be assumed that the "INVITE" message of FIG. 10 was sent as the "INVITE" message. For this reason, IP telephone 102 acknowledges URI "taro@tokyo.sip.jp" that is specified by the To header. Then, the call reception screen that corresponds to the URI that was acknowledged is received from call reception screen information table 1302, and a call reception screen displaying process is carried out (ST1601). After the call reception screen displaying process is carried out, IP telephone 102 produces a calling sound. At this point, "taro(ˆoˆ)/" is obtained as a call reception screen for IP telephone 102 and it is displayed on display 209.

Figure 17:
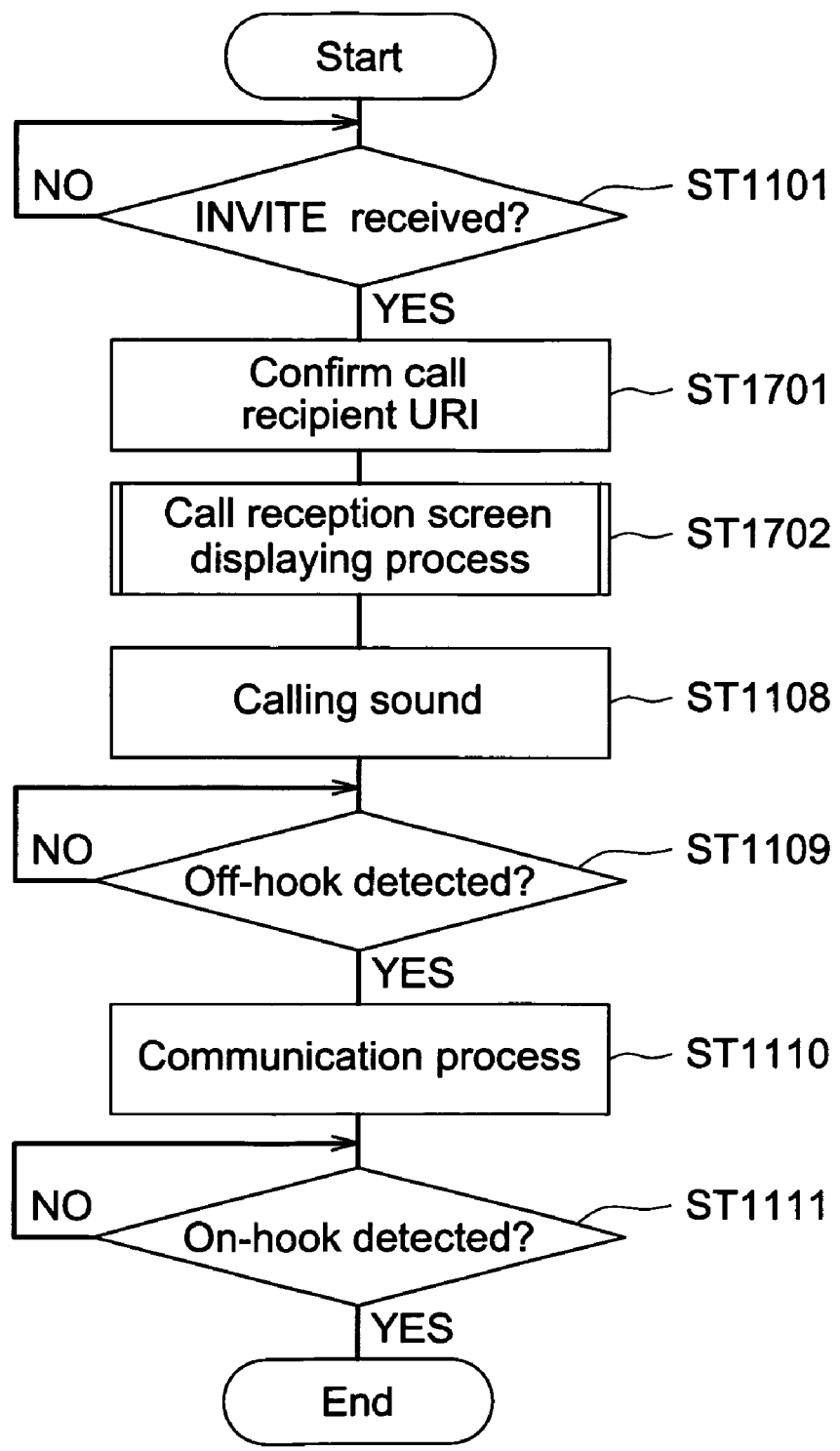
FIG. 17 is a flow chart that describes the operation of the destination IP telephone in the FIG. 16 sequence.

FIG. 17 is a flowchart that describes the operation of the destination IP telephone 102 in the FIG. 16 sequence. The elements of FIG. 17 that are labeled identically to those of FIG. 11 perform the same function and thus an explanation of these will be omitted.

In the destination IP telephone 102 of the IP telephone system of the second embodiment of the present invention, when an "INVITE" message is received in step ST1101, the URI that is specified by the To header as the one for call reception (hereinafter referred to as a "call recipient URI") is acknowledged (ST1701). Then, the call reception screen that corresponds to the call recipient URI that was acknowledged is obtained from call reception screen information table 1302 by IP telephone 102, and the call reception screen displaying process is carried out (ST1702). Then, the communication process is completed after steps ST1108-ST1111 are carried out in a similar fashion to that of the first embodiment of the present invention.

Thus in the IP telephone system of the second embodiment of the present invention, a plurality of telephone numbers are assigned to the destination IP telephone 102, and an outgoing call is placed by specifying the telephone number from the source IP telephone 101. Then, after receiving the NAPTR response that corresponds to this telephone number, an "INVITE" message is sent to the destination IP telephone 102. The destination IP telephone 102 then acknowledges the call recipient URI from this "INVITE" message. Then, the call reception screen that corresponds to this call recipient URI is obtained from call reception screen information table 1302. Then, the call reception screen displaying process is carried out. Consequently, the call reception screen that corresponds to the telephone number that is specified by the source IP telephone 101 is displayed on display 209 of the destination IP telephone 102. As a result of this, the user of IP telephone 102 can look at the call reception screen to identify the intended user, and thus the intended user can be identified before the phone is picked up.

In the flowchart of FIG. 17, the call recipient URI that is listed in the "INVITE" message is acknowledged in step ST1701, and the call reception screen that corresponds to the call recipient URI is obtained from call reception screen information table 1302 and the call reception screen displaying process is carried out in step ST1702. However, this process is not limited to when the call reception screen displaying process is based upon the contents of the "INVITE" message. For example, the user name that is specified before the "@" mark of the call recipient URI that is listed in the "INVITE" message can be acknowledged, and the call reception screen displaying process can be carried out based upon the call reception screen that is obtained from call reception screen information table 1302 and also corresponds to this user name. This alternative process still reaps the same benefits as that of the first embodiment of the present invention.

In the IP telephone system of the first embodiment of the present invention, the voice is not limited to human conversations, as it also includes general sounds, sound modulations of a modem signal, and a fax signal. The telephone can also be a facsimile apparatus.

Furthermore, in the IP telephone system of the first embodiment of the present invention, the explanation was done for the situation in which the IP telephone exists as an individual unit, but this does not always have to be the case. This means that the IP telephone system can include an IP telephone that is actually a regular telephone that is connected to a control adaptor which allows the regular telephone to function as an IP telephone. Furthermore, the regular telephone can also be a telephone apparatus that does not have the capability to perform voice communications over IP network 106.

Finally, the IP telephone of the above-noted explanation includes the IP telephones that are proposed by the Japanese government and used by the telecommunications carriers, local networks, and self-contained networks that include computer communication protocols such as TCP/IP.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-228584 filed on Aug. 4, 2004 entire content of which is expressly incorporated by reference herein.

What is claimed is:

1. An Internet Protocol (IP) telephone system, comprising:
a call originating IP telephone apparatus that is connected to an IP network;
a call receiving IP telephone apparatus that is connected to the IP network, a plurality of concurrently active telephone numbers being assigned to the call receiving IP telephone apparatus;
a Web server that stores call reception screen information corresponding to each of the plurality of concurrently active telephone numbers assigned to the call receiving IP telephone apparatus, and transmits to the call receiving IP telephone apparatus the call reception screen information that corresponds to an intended recipient telephone number of the plurality of concurrently active telephone numbers as a response to a request from the call receiving IP telephone apparatus; and
a Telephone Number Mapping (ENUM) server that stores a plurality of Naming Authority Pointer (NAPTR) resource records for a given ENUM domain name, in which a Uniform Resource Identifier (URI) of one of the plurality of NAPTR resource records specifies link information for the call reception screen information stored in the Web server, and transmits a NAPTR resource record to the call receiving IP telephone apparatus in response to a query from the call receiving IP telephone apparatus,
wherein at a period from a reception by the call receiving IP telephone apparatus of an INVITE message according to Session Initiation Protocol (SIP) to sounding a ring tone, the call receiving IP telephone apparatus extracts a called intended recipient telephone number from the received INVITE message; generates, upon reception of a call for the intended recipient telephone number of the plurality of concurrently active telephone numbers assigned to the call receiving IP telephone apparatus, an ENUM domain name from the called intended recipient telephone number; transmits a query to the ENUM server that queries for the generated ENUM domain name of an NAPTR resource record comprising the URI corresponding to the call reception screen information for the called intended recipient telephone number; transmits a request to the Web server for requesting call reception screen information that corresponds to the called intended recipient telephone number, wherein the request includes the URI corresponding to the call reception screen information and wherein the URI is obtained from the queried NAPTR resource record; and displays a call reception screen with obtained call reception screen information that corresponds to the intended recipient telephone number.

2. The IP telephone system according to claim 1, wherein a HyperText Transfer Protocol (http protocol) is specified in the NAPTR resource records stored on said ENUM server, and, when a call is received, said call receiving IP telephone apparatus transmits, to said Web server, a request for the call reception screen information corresponding to the intended recipient telephone number according to the http protocol.

3. The IP telephone system according to claim 1, wherein, when a call is received, said call receiving IP telephone apparatus obtains the intended recipient telephone number based on a description of a received INVITE message.

4. An Internet Protocol (IP) telephone apparatus that receives calls, which is connected to a Web server and a Telephone Number Mapping (ENUM) server, the Web server storing call reception screen information corresponding to each of a plurality of concurrently active telephone numbers assigned to the call receiving IP telephone apparatus on an IP network, the ENUM server storing a plurality of Naming Authority Pointer (NAPTR) resource records for a given ENUM domain name, in which a Uniform Resource Identifier (URI) of each of the plurality of NAPTR resource records specifies link information for the call reception screen information, the call reception screen information being stored on the Web server, the call receiving IP telephone apparatus comprising:
a receiver for receiving an INVITE message according to Session Initiation Protocol (SIP);
an extractor for extracting a called intended recipient telephone number from the received INVITE message;
a generator that generates an ENUM domain name from the called intended recipient telephone number upon reception of a call from a call originating IP telephone apparatus for the intended recipient telephone number of the plurality of concurrently active telephone numbers assigned to the call receiving IP telephone apparatus;
a querier that transmits, to the ENUM server, a query for a generated ENUM domain name of an NAPTR resource record comprising the URI corresponding to the call reception screen information for the called intended recipient telephone number;
a requester that transmits, to the Web server, a request for the call reception screen information corresponding to the called intended recipient telephone number, wherein the request includes the URI corresponding to the call reception screen information, the URI being obtained from the queried NAPTR resource record;
a display that displays a call reception screen with obtained call reception screen information that corresponds to the intended recipient telephone number; and
a speaker for sounding a ring tone.

5. The IP telephone apparatus that receives calls according to claim 4, wherein said requester transmits, to the Web server, a request for the call reception screen information corresponding to the intended recipient telephone number according to a HyperText Transfer Protocol (http protocol), the http protocol being specified in the NAPTR resource record stored on the ENUM server.

6. The IP telephone apparatus that receives calls according to claim 4, wherein said querier transmits a query for the NAPTR resource record according to the intended recipient telephone number obtained based on a description of an INVITE message, the INVITE message being received from the call originating IP telephone apparatus.

7. A method for identifying a destination user using an Internet Protocol (IP) telephone apparatus that receives calls, the call receiving IP telephone apparatus being connected to a Web server and a Telephone Number Mapping (ENUM) server, the Web server storing call reception screen information corresponding to each of a plurality of concurrently active telephone numbers assigned to the call receiving IP telephone apparatus on an IP network, the ENUM server storing a plurality of Naming Authority Pointer (NAPTR) resource records for a given ENUM domain name, in which a Uniform Resource Identifier (URI) of each of the plurality of NAPTR resource records specifies link information for the call reception screen information, the call reception screen information being stored on the Web server, the method comprising:

receiving, by the call receiving IP telephone apparatus, an INVITE message according to Session Initiation Protocol (SIP);

sounding a ring tone; and performing the following at a period from the reception, by the call receiving IP telephone apparatus, of the INVITE message according to SIP protocol to the sounding of the ring tone:

extracting a called intended recipient telephone number from the received INVITE message;

generating, by the call receiving IP telephone apparatus, an ENUM domain name from the called intended recipient telephone number upon reception of a call from a call originating IP telephone apparatus for the intended recipient telephone number of the plurality of concurrently active telephone numbers assigned to the call receiving IP telephone apparatus;

transmitting, by the call receiving IP telephone apparatus to the ENUM server, a query for the generated ENUM domain name of an NAPTR resource record comprising the URI corresponding to the call reception screen information for the called intended recipient telephone number;

transmitting, by the call receiving IP telephone apparatus to the Web server, a request for the call reception screen information for the called intended recipient telephone number, wherein the request includes the URI corresponding to the call reception screen information, the URI being obtained from the queried NAPTR resource record; and displaying, by the call receiving IP telephone apparatus, a call reception screen with obtained call reception screen information that corresponds to the intended recipient telephone number.

8. The method for identifying a destination user according to claim 7, wherein transmitting by the call receiving IP telephone apparatus to the Web server comprises transmitting the request for the call reception screen information corresponding to the intended recipient telephone number according to a HyperText Transfer Protocol (http protocol), the http protocol being specified in the NAPTR resource record stored on the ENUM server.

9. The method for identifying a destination user according to claim 7, wherein the intended recipient telephone number is obtained based on a description of an INVITE message, the INVITE message being received from the call originating IP telephone apparatus.

\* \* \* \* \*